United States Patent [19]
Bungart et al.

[11] Patent Number: 5,492,310
[45] Date of Patent: Feb. 20, 1996

[54] HYDRAULICALLY DAMPING ELASTIC BEARING

[75] Inventors: Ernst Bungart, Bad Münstereifel-Odesheim; Josef Gross, Sinzig-Westum; Peter Maier, Wachtberg; Jörn-Rainer Quast, Sinzig, all of Germany

[73] Assignee: Boge GmbH, Bonn, Germany

[21] Appl. No.: 311,340

[22] Filed: Sep. 23, 1994

[30] Foreign Application Priority Data

Sep. 24, 1993 [DE] Germany .................... 43 32 480.0

[51] Int. Cl.⁶ .................................................. F16F 13/00
[52] U.S. Cl. ...................................... 267/140.12; 267/220
[58] Field of Search ........................... 267/140.12, 141.1, 267/141.2, 293, 220

[56] References Cited

U.S. PATENT DOCUMENTS 4,953,833  9/1990  Schmidt et al. .................. 267/140.12
4,982,938  1/1991  Brenner ........................... 267/140.12

FOREIGN PATENT DOCUMENTS 3827905  3/1990  Germany .
8203242  11/1983  Japan ............................. 267/140.12
2118132  5/1985  Japan ............................. 267/140.12

*Primary Examiner*—Matthew C. Graham
*Attorney, Agent, or Firm*—Nils H. Ljungman & Associates

[57] ABSTRACT

Hydraulically damping rubber bearing including an inner part, an outer part oriented concentrically or eccentrically in relation to the inner part and at some distance from the inner part, and a rubber part inserted between the inner part and the outer part, in which rubber part there are at least two chambers filled with damping medium, whereby at least two chambers are connected to one another by means of a flow connection, whereby the flow connection is located in a rigid element and is contained in the rubber part.

9 Claims, 5 Drawing Sheets

HYDRAULICALLY DAMPING ELASTIC BEARING

BACKGROUND OF THE INVENTION

1. Field of the Invention

The present invention relates to a hydraulically damping rubber or elastic bearing including an inner part, and an outer part oriented concentrically or eccentrically in relation to the inner part, and at some distance from the inner part. The bearing can also include a rubber or elastic part inserted between the inner part and the outer part, in which rubber part there are at least two chambers filled with damping medium, whereby the chambers are connected to one another by means of a flow connection.

2. Background Information

German Laid Open Patent Application No. 38 27 905, which corresponds to U.S. Pat. No. 4,953,833 to Schmidt et al. (Sep. 4, 1990), for example, discloses a hydraulically damping rubber bearing such as that described above, in which a rubber element is located between the outer part and the inner part, whereby the chambers filled with damping medium are connected to one another by means of a flow connection. The flow connection thereby runs in the form of a passage in the outer tube, or in the end-window tube of the rubber part, which means that an additional lathe turning or deformation operation is typically necessary to manufacture the flow connection. The cross section of such a passage also tends to be subject to corresponding manufacturing tolerances, so that variations of the damping values will almost inevitably occur in the context of series production.

Also disclosed are hydraulically damping rubber bearings in which the flow connection is located directly in the rubber part, whereby the cross section of the damping passage not only tends to be imprecise, but also cannot typically be manufactured with a sufficiently small diameter. The tolerances also tend to be subject to a rather large spread during manufacture. Further, there is also a risk that changes in the cross section of the passage can occur during the operation of the rubber bearing, as a result of corresponding deformations of the rubber part.

OBJECT OF THE INVENTION

The object of the present invention is to design a hydraulically damping rubber bearing such that a flow connection is created which is independent of manufacturing tolerances, and which design also makes possible flow cross sections smaller than about 1 mm$^2$, and which design also makes possible flow cross sections which remain essentially constant during operation.

SUMMARY OF THE INVENTION

The present invention teaches that this object can be achieved if the flow connection or passage is preferably located in a rigid element, and is preferably contained in the rubber part.

In other words, the flow connection or passage can preferably be located in a rigid element, and the rigid element can preferably be contained in the rubber part.

One advantage of this configuration is that the passage can preferably be manufactured in a separate component. Thus, before the assembly of the rubber bearing, the passage can be located in the rubber part, in the outer tube, or possibly in the inner tube. As a result of locating the flow passage in a rigid component, there is essentially no longer any danger that deformations of the cross section of the flow passage will occur during operation. Flow connections can also be created in individual zones, which can also be provided with a correspondingly small cross section.

In other words, the passage can preferably be disposed in the rigid element, and the rigid element can preferably be manufactured as a separate component. The rigid element containing the passage can then be located in the rubber part, in the outer tube, or possibly in the inner tube.

One advantageous feature, according to a preferred embodiment of the present invention, is that the inner and/or outer part, or possibly the rubber part and/or the outer part, can preferably form a part of the wall of the flow connection. An advantage of this arrangement is essentially that the rigid element can be provided with a flow connection which is located essentially on the surface of the rigid element. The rigid element, together with the inner or outer part, or possibly the rubber part and/or the outer part, thereby can preferably form the wall of the flow connection.

To simplify the installation of the rigid element, the rigid element can preferably be located in a recess in the rubber part. The rigid element, after assembly, can thereby be advantageously contained in the rubber part in an interlocking, or possibly a form-fitting manner.

Another advantageous feature, and according to a preferred embodiment of the present invention, is that the rigid element can preferably have recesses on the end surface, or surfaces, which can form an interlocking connection with the rubber part.

In one favorable embodiment of the present invention, the rigid element can be provided on the side facing the rubber part with at least one sealing edge. The sealing edge can advantageously have at least one raised, or possibly convex, projection which can preferably run over the entire surface of the rigid element. The sealing edge preferably prevents an uncontrollable flow of the damping medium into the flow connection.

In an additional configuration, the flow connection can preferably be located in the form of a straight-line groove in the rigid element, or, alternatively, the flow connection can follow a path which is essentially not a straight line. The configuration of the flow connection can therefore be individually and variably selected, depending on the required damping characteristics.

Embodiments are also conceivable in which the rigid element is provided with at least two flow connections, and possibly more than two flow connections.

In accordance with one embodiment of the present invention which is both economical and easy to manufacture, the rigid element can preferably be designed as a plastic part.

One aspect of the invention resides broadly in a hydraulically damping elastic bearing comprising: an inner portion; an outer portion disposed about the inner portion; the inner portion comprising: a partition disposed at least partially within the outer portion; the partition comprising at least an elastic portion; the partition and the outer portion defining at least two chambers; the at least two chambers being disposed between the inner portion and the outer portion; the at least two chambers containing damping fluid; passage means disposed to conduct flow of damping fluid between the at least two chambers; the passage means comprising: wall means; the wall means being disposed to lead the flow of the damping fluid between the at least two chambers; the wall means being in direct contact with the damping fluid; the wall means comprising a rigid material; and the rigid material comprising a material sufficiently rigid such that the wall means is minimally distorted during use of the bearing.

BRIEF DESCRIPTION OF THE DRAWINGS

Preferred embodiments of the invention are schematically illustrated in the accompanying drawings in which.

DESCRIPTION OF THE PREFERRED EMBODIMENTS

Figure 1:
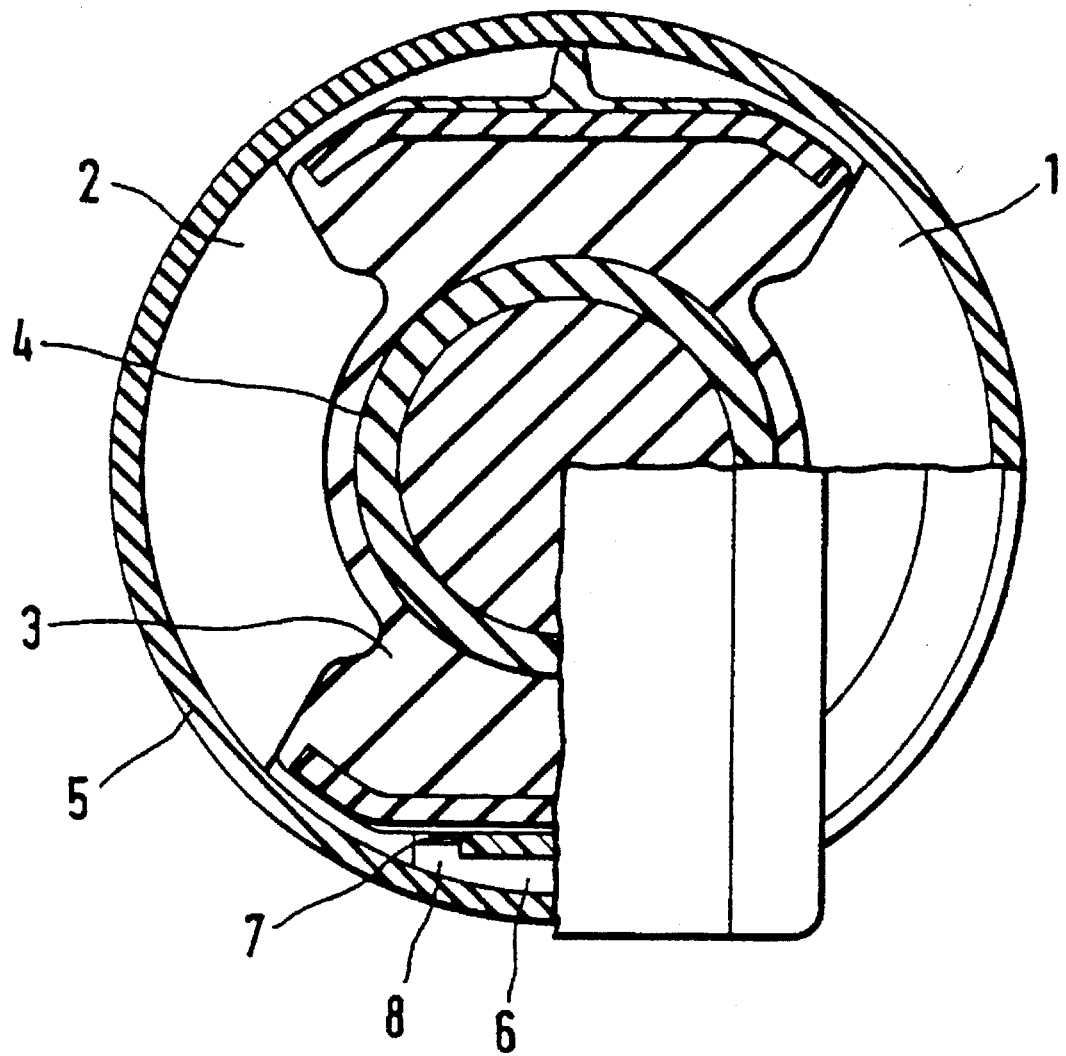
FIG. 1 shows a hydraulically damping rubber bearing in cross section.

The hydraulically damping rubber bearing illustrated in FIG. 1 can generally include an inner part 4 and an outer part 5, whereby the rubber part 3 can preferably be inserted between the two. Chambers 1 and 2 can preferably be located in the rubber part 3, and the two chambers can be connected to one another by means of a flow connection 6, so that, depending on the load exerted on the rubber bearing, a corresponding hydraulic damping can preferably be generated in the flow connection 6.

The flow connection 6 can preferably be located inside a rigid element 7, whereby a wall 8 of the outer part 5, together with the flow connection 6, can preferably form a corresponding passage.

In accordance with one embodiment of the present invention, wall 8 can be considered to be a wall of the flow connection 6 in rigid element 7. Further, chambers 1 and 2 can preferably be disposed between rubber part 3 and outer part 5.

In accordance with at least one embodiment of the present invention, flow connection 6 can preferably be formed partially from the rigid element 7 and partially from outer part 5. Thus, rigid element 7 and outer part 5 can both preferably have wall portions which, when assembled, meet one another to form the flow connection 6. More specifically, outer part 5 can preferably have an interior surface 5a (see FIG. 1a), which interior surface 5a can preferably form a part of flow connection 6. In addition, outer part 5 can also have a flanged portion which can preferably correspond to wall 8, which flanged portion can extend outwardly from interior surface 5a towards rigid element 7. Thus, the flanged portion of outer part 5 can also form a part of flow connection 6. Essentially, to complete flow connection 6, rigid element 7 can have an interior surface 7a and also an additional wall portion which cannot be seen in FIG. 1a, but which would be disposed substantially opposite the flanged portion of outer part 5, and would extend outwardly from interior surface 7a. Thus, interior surface 5a of outer part 5 can preferably be disposed to meet or contact the additional wall portion of rigid element 7, and the flanged portion corresponding to wall 8 can preferably be disposed to meet or contact interior surface 7a of rigid element 7.

In accordance with yet an additional embodiment of the present invention, wall 8 can preferably correspond to a wall of the flow connection 6 in the rigid element 7. The rigid element 7 can then have an additional wall portion disposed opposite wall 8 and preferably facing wall 8. Interior surface 7a of rigid element 7 can form another wall portion of flow connection 6, and the interior surface 5a of outer part 5 can then complete the flow connection 6.

In accordance with still another embodiment of the present invention, outer part 5 can preferably have a flanged portion corresponding to wall 8, which flanged portion can extend substantially outwardly from interior surface 5a. In addition, outer part 5 can preferably have an additional flanged portion disposed opposite and facing the flanged portion corresponding to wall 8, the two flanged portions preferably extend from interior surface 5a, and can preferably be disposed spaced apart from one another. Thus, in accordance with this particular embodiment of the present invention, the outer part 5 can be considered to contribute 3 portions to flow connection 6. To complete flow connection 6, surface 7a of rigid element 7 can be disposed to meet or contact the flanged portions of outer part 5, as described above.

In accordance with at least one embodiment of the present invention, rubber part 3 can preferably be made of neoprene, or other suitable elastic material.

Figure 1A:
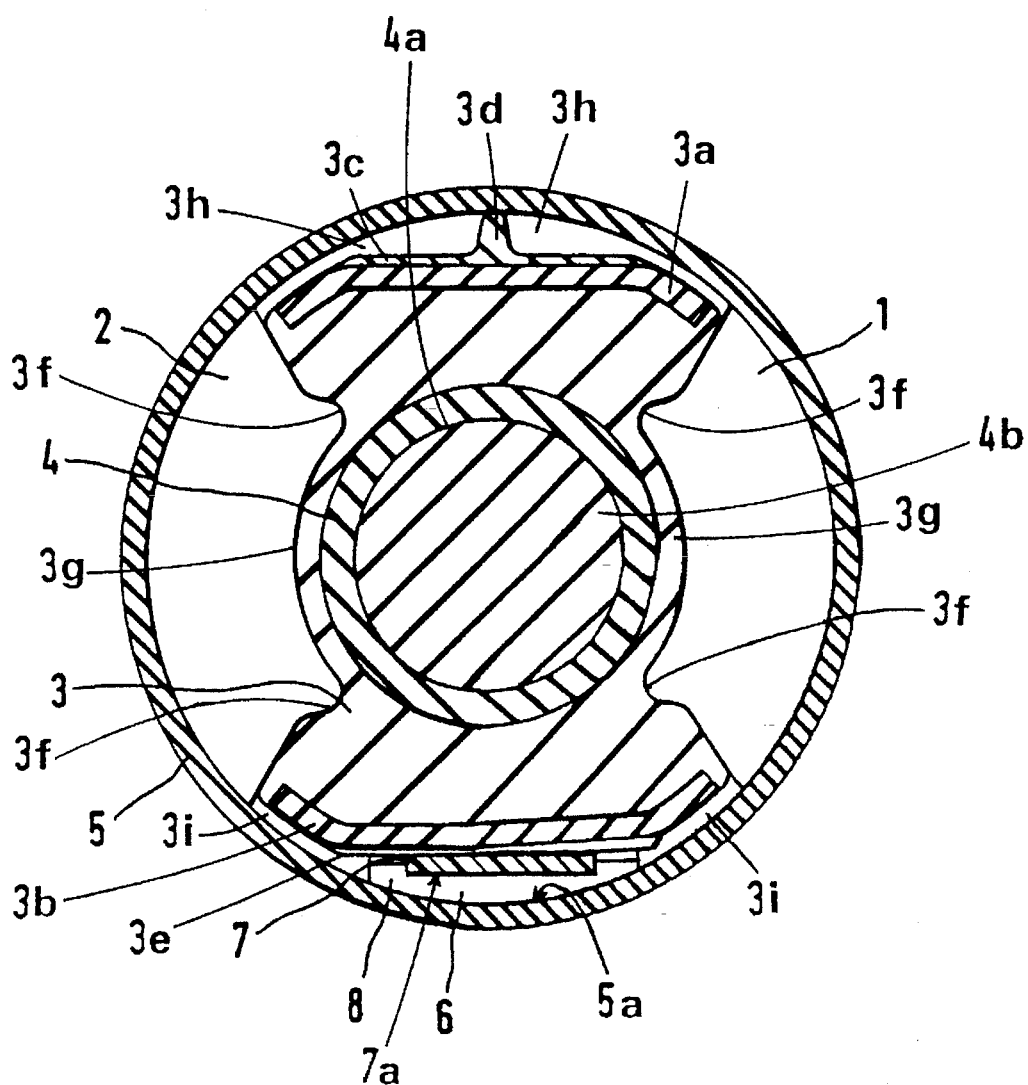
FIGS. 1a and 1b show substantially the same view as FIG. 1, but show additional components.

FIG. 1a illustrates an additional embodiment of the present invention, similar to that shown in FIG. 1, with additional components. The embodiment shown in FIG. 1a shows the rubber bearing essentially completely in cross section. The embodiment of the bearing shown in FIG. 1a also generally includes an inner part 4 and an outer part 5, with the rubber part 3 preferably inserted between the two. The chambers 1 and 2 can also preferably be located in the rubber part 3 and can be connected to one another by means of the flow passage 6. The flow passage 6 is preferably located at least partially inside rigid element 7.

In addition, the bearing can also include members 3a and 3b, which can preferably be disposed in rubber part 3. Members 3a and 3b can preferably serve as supports for rubber part 3 and can preferably be made of metal, plastic, or other suitable rigid material. The bearing Can also include an additional member 3c, which additional member 3c can preferably have a projection 3d. Projection 3d can preferably be made of rubber or other suitable elastic material and can serve to correctly position, or center, the rubber part 3 inside outer part 5. Adjacent member 3c, there can preferably be additional passages 3h, preferably disposed on either side of projection 3d. The passages 3h can preferably be part of rubber part 3, and therefore can also be made of rubber or other suitable elastic material. Adjacent support member 3b, there can preferably be disposed yet additional passages 3i, preferably disposed on either side of rigid element 7. The passages 3i can also preferably be a part of rubber part 3, and therefore can also be made of rubber or other suitable elastic material. Further, the bearing can also preferably have a hole 4a, which can assist in mounting the bearing, possibly on a shaft 4b. Shaft 4b can, in accordance with at least one embodiment of the present invention, be a permanent shaft. In accordance with an alternative embodiment of the present invention, shaft 4b may be a temporary shaft which is capable of being removed from the bearing.

As also shown in FIG. 1a, and in accordance with at least one embodiment of the present invention, rubber part 3 can preferably have recessed portions 3f, and intermediate portions 3g, which intermediate portions 3g can preferably substantially match the contour of inner part 4.

Figure 1B:
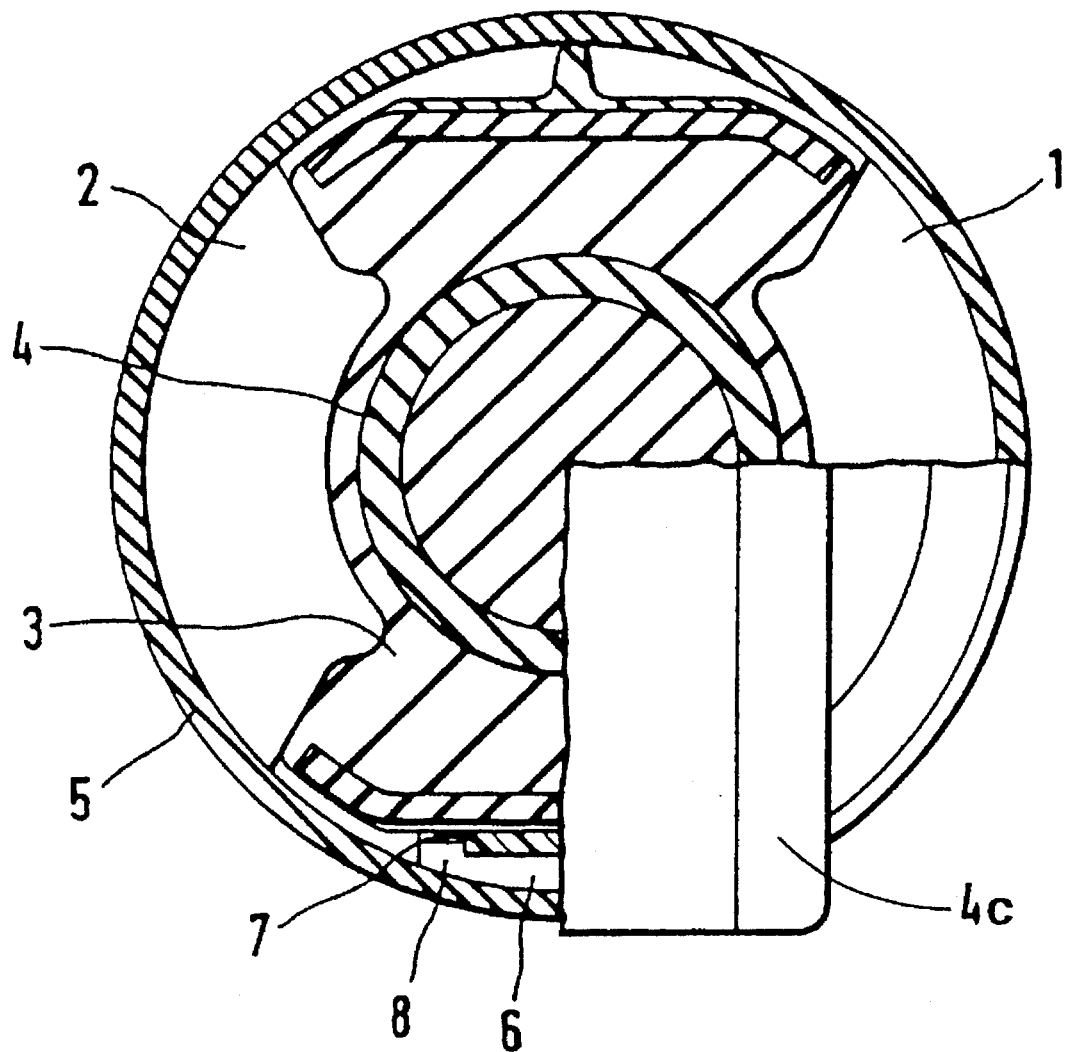

In accordance with at least one embodiment of the present invention shown in FIG. 1b, a sleeve 4c can preferably be disposed adjacent the bearing. An additional shaft not shown here could conceivably be inserted into sleeve 4c, possibly for mounting the bearing. Further, in accordance with at least one embodiment of the present invention, sleeve 4c may be attached in a suitable manner to shaft 4b. Sleeve 4c could possibly be made of a metal material, such as steel, and could possibly be welded to outer part 5, to support members 3a or 3b, or possibly to inner part 5.

Figure 2:
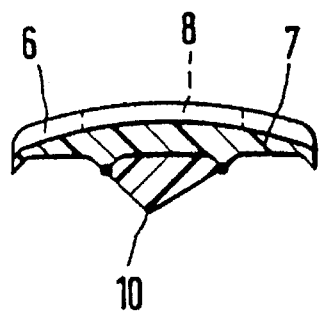
FIGS. 2 and 2a show a cross-sectional side view of a rigid element.
Figure 3:
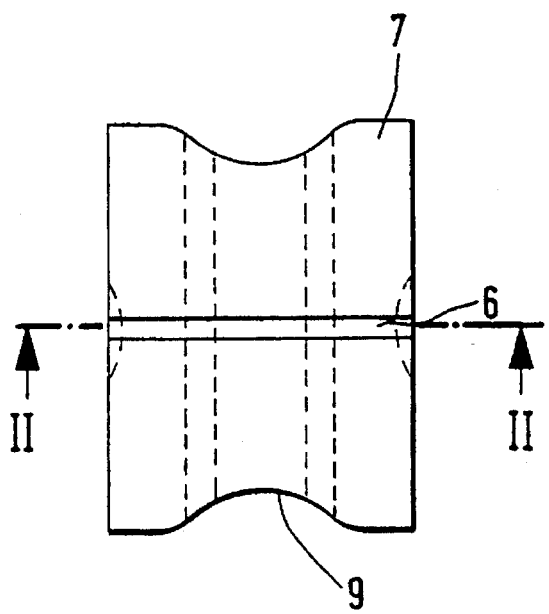

FIGS. 2 and 3 show the rigid element 7, the outer surface of which rigid element 7 can be provided with the flow connection 6, and the underside of which rigid element 7 can have corresponding sealing edges 10, preferably for insertion into the rubber part 3. The end surfaces of the rigid element 7 can preferably have recesses 9 which, together with the rubber part 3, produce an interlocking connection, so that before the installation of the inner part or tube 4, the rigid element 7 can be appropriately fixed in place together with the rubber part 3 in the outer part 5.

In accordance with at least one embodiment of the present invention, rubber part 3 can preferably have projections or portions, which projections can preferably be configured for interlocking, or possibly form-fitting, with the recesses 9 of rigid element 7. In addition, the rubber part 3 can also preferably have a recess for the insertion of the rigid element 7. Further sealing edges 10 can preferably provide a seal between rigid element 7 and rubber part 3.

The flow connection 6 is shown in FIG. 3 as a substantially straight line, but as FIG. 2 shows, a corresponding radius can also be described as a function of the contour of the outer part 5 in the transverse direction. In other words, rigid element 7 can be configured to essentially match the contour of outer part 5, preferably so that flow connection 6 can have a contour similar to the contour of outer part 5. Further, the rigid element 7 preferably be made of plastic, or of similar easily-worked materials. Some examples of plastics which the rigid element could possibly be made of are acrylonitrile polymers, such as acrylonitrile-butadiene-styrene terpolymers (ABS). Other types of plastics which the rigid element 7 could be made of are poly(vinyl chloride) (PVC), or polyethylene.

Figure 2A:
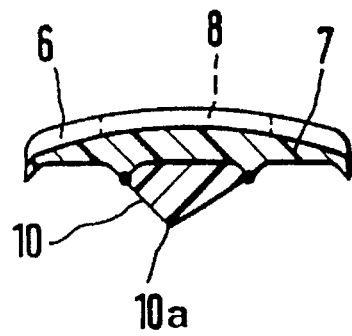

In accordance with the embodiment of the present invention shown in FIG. 2a, edge 10 may have a pointed portion 10a, possibly for piercing rubber part 3, or possibly for piercing an outer portion 3e (see FIG. 1a) of rubber part 3. Alternatively, outer portion 3e may be a part of support member 3b (see FIG. 1a). Further, edge 10 can preferably extend over a portion of rigid element 7, as shown in FIG. 2a. Alternatively, edge 10 can preferably extend substantially across the entire extent of rigid element 7. Edge 10 may be raised with respect to rigid element 7, or can possibly even have a convex configuration with respect to rigid element 7.

In accordance with one embodiment of the present invention, FIG. 2a may be considered as representing a side view of rigid element 7 taken along line II—II of FIG. 3.

Figure 4:
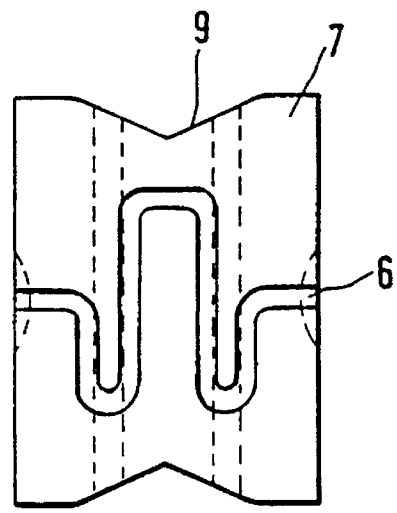
FIGS. 3, 4, 4a, 5, and 5a show various embodiments of the rigid element with the corresponding flow connection, all in plan view.

FIG. 4, in contrast to FIG. 3, shows a flow connection 6 which has a corresponding passage length and runs, as necessary, over the surface of the rigid element 7.

Figure 4A:
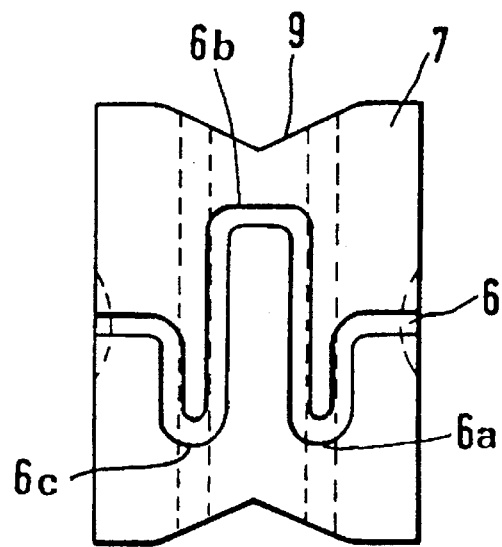

As shown in FIG. 4a, and in accordance with at least one embodiment of the present invention, the flow connection 6 can have three bends 6a, 6b, and 6c, which can preferably run along the surface of the rigid element 7. Further, the recesses 9, as illustrated in the embodiments shown in FIGS. 4 and 4a, can preferably have a triangular shape.

Figure 5:
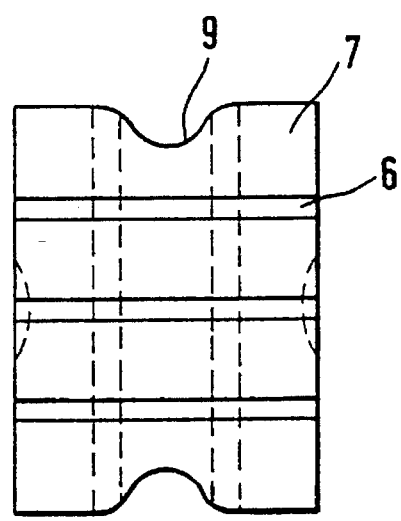
Figure 5A:
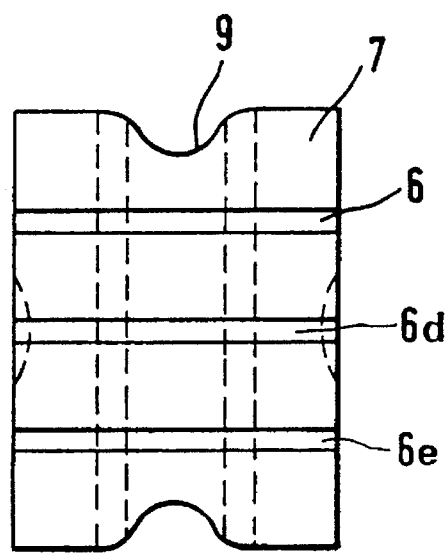

FIG. 5 shows a rigid element 7 in which there are several passages or flow connections, which passages are preferably oriented substantially parallel to one another. The number of passages and the cross section of the passages is preferably a function of the damping requirements. As shown in FIG. 5a, and in accordance with at least one embodiment of the present invention, there can preferably be three passages or flow connections 6, 6d, and 6e, depending on the damping characteristics required. Further, the recesses 9, as illustrated in the embodiments shown in FIGS. 5 and 5a, can preferably have a semi-circular shape.

In accordance with an additional embodiment of the present invention not shown here, flow passage 6 could be, disposed directly in inner part 4. In accordance with this particular embodiment, flow passage 6 could then lead on either side to at least two passage openings, preferably disposed in the intermediate portions 3g (see FIG. 1a) of rubber part 3. One passage opening could preferably open into chamber 1, and the other passage opening could preferably open into chamber 2. Further, flow passage 6 could be located inside inner part 4, as discussed above, and could substantially follow the contour of inner part 4.

Alternatively, in accordance with an additional embodiment of the present invention, flow passage 6 could be disposed directly in outer part 5, whereby flow passage 6 could then lead on either side to at least two passage openings, which passage openings could preferably be disposed in outer part 5, one passage preferably opening into chamber 1, the other preferably opening into chamber 2. Further, flow passage 6 could be located inside outer part 5 and could substantially follow the contour of outer part 5.

In accordance with at least one embodiment of the present invention, the bearing can preferably have a diameter of about 90 mm, but is not to be taken as limited to this value. Thus, the diameter of the bearing may range from about 50 mm or less to about 200 mm or more. Further, the bearing can also have a length, preferably extending along a longitudinal axis of the bearing, of about 20 mm, but is not to be taken as limited to this value. Thus, the length of the bearing may range from about 20 mm or less to about 200 mm or more.

The bearing as shown and described hereinabove can conceivably be used in motor vehicles, more particularly, wheel suspensions, steering linkages, tie rod connections, and the like. Of course, other uses for the bearing in accordance with the present invention are possible and thus the list mentioned immediately above should not be considered to be exhaustive.

Types of bearings in which the present invention could be incorporated are disclosed in the following U.S. Pat. Nos. 5,165,669 to Mayerböck et al. on Nov. 24, 1992, entitled "Hydraulically Damping Elastomer Bearing"; 4,958,811 to Brenner et al. on Sep. 25, 1990, entitled "Hydraulically Damping Elastic Bearing"; and 4,741,521 to Schiffner et al. on May 3, 1988, entitled "Axially Loadable Bearing".

Various bearings and sealing methods which may be used in accordance with the present invention are disclosed in the following U.S. Pat. Nos. 4,928,371 to Colanzi et al. on May 29, 1990, entitled "Method of Making a Seal for Bearing Assembly"; 4,690,574 to Green on Sep. 1, 1987, entitled "Bearing and Method for Rotatably Supporting a Worn Shaft"; 4,832,638 to Sirois on May 23, 1989, entitled "Integral Propulsion and Steering Unit"; and 5,239,740 to Ladouceur on Aug. 31, 1993, entitled "Method of Installing Sealing Fastener".

One feature of the invention resides broadly in the hydraulically damping rubber bearing consisting of an inner part, an outer part oriented concentrically or eccentrically in relation to it and at some distance from it, and a rubber part inserted between the two, in which rubber part there are at least two chambers filled with damping fluid, whereby at least two chambers are connected to one another by means of a flow connection, characterized by the fact that the flow connection 6 is located in a rigid element 7 and is contained in the rubber part 3.

Another feature of the invention resides broadly in the rubber bearing characterized by the fact that the inner part 4 and/or the outer part 5 forms a portion of the wall 8 of the flow connection 6.

Yet another feature of the invention resides broadly in the rubber bearing characterized by the fact that the rubber part 3 and/or the outer part 5 forms a portion of the wall 8 of the flow connection 6.

Another feature of the invention resides broadly in the rubber bearing characterized by the fact that the rigid element 7, together with the inner part 4 or the outer part 5, forms the wall 8 of the flow connection 6.

Yet another feature of the invention resides broadly in the rubber bearing characterized by the fact that the rigid element 7, together with the rubber part 3 or the outer part 5, forms the wall 8 of the flow connection 6.

Still another feature of the invention resides broadly in the rubber bearing characterized by the fact that the rigid element 7 is located in a recess of the rubber part 3.

A further feature of the invention resides broadly in the rubber bearing characterized by the fact that after installation, the rigid element 7 is contained in the rubber part 3 in a form-fitting or interlocking manner.

Another feature of the invention resides broadly in the rubber bearing characterized by the fact that the rigid element 7 has recesses 9 on the end surfaces to form an interlock.

Yet another feature of the invention resides broadly in the rubber bearing characterized by the fact that the rigid element 7, on the side facing the rubber part 3, is provided with at least one sealing edge 10.

Still another feature of the invention resides broadly in the rubber bearing characterized by the fact that as the sealing edge 10, there is at least one raised or possibly convex projection which runs over the entire surface.

A further feature of the invention resides broadly in the rubber bearing characterized by the fact that the flow connection 6 is located in the rigid element 7 and has the shape of a straight-line groove.

Another feature of the invention resides broadly in the rubber bearing characterized by the fact that the flow connection 6 follows a path which is not a straight line.

Yet another feature of the invention resides broadly in the rubber bearing characterized by the fact that the rigid element 7 is provided with at least two flow connections 6.

Still another feature of the invention resides broadly in the rubber bearing characterized by the fact that the rigid element 7 is designed as a plastic part.

The appended drawings in their entirety, including all dimensions, proportions and/or shapes in at least one embodiment of the invention, are accurate and to scale and are hereby included by reference into this specification.

All, or substantially all, of the components and methods of the various embodiments may be used with at least one embodiment or all of the embodiments, if more than one embodiment is described herein.

All of the patents, patent applications and publications recited herein, and in the Declaration attached hereto, are hereby incorporated by reference as if set forth in their entirety herein.

The corresponding foreign patent publication applications, namely, Federal Republic of Germany Patent Application No. P 43 32 480.0, filed on Sep. 24, 1993, having inventors Ernst Bungart, Josef Groβ, Peter Maier, and Jörn-Rainer Quast, and DE-OS P 43 32 480.0 and DE-PS P 43 32 480.0, as well as their published equivalents, and the references cited in any of the documents cited herein, are hereby incorporated by reference as if set forth in their entirety herein.

The details in the patents, patent applications and publications incorporated herein by reference, form part of the specification and are incorporable into the claims during prosecution as further limitations in the claims to patentably distinguish any amended claims from any applied prior art.

The invention as described hereinabove in the context of the preferred embodiments is not to be taken as limited to all of the provided details thereof, since modifications and variations thereof may be made without departing from the spirit and scope of the invention.

What is claimed is:

1. A hydraulically damping elastic bearing comprising:

an inner portion;

an outer portion disposed about said inner portion;

said inner portion comprising:

a partition disposed at least partially within said outer portion;

said partition comprising at least an elastic portion;

said partition and said outer portion defining at least two chambers;

said at least two chambers being disposed between said inner portion and said outer portion;

said at least two chambers containing damping fluid;

passage means disposed to conduct flow of damping fluid between said at least two chambers;

said passage means being fixedly disposed in said bearing;

said passage means comprising:

wall means;

said wall means being disposed to lead the flow of the damping fluid between said at least two chambers;

said wall means comprising a rigid material;

said rigid material comprising a material having a rigidity sufficient for minimizing distortion of said material during use of said bearing;

means for fixedly disposing said passage means in said bearing;

said means for fixedly disposing comprising a substantially rigid member, said substantially rigid member being disposed between said inner portion and said outer portion;

said substantially rigid member comprising at least one recess for engaging with said partition, said wall means being disposed in said rigid member;

said wall means defining a central axis of flow and comprising a cross-section disposed substantially perpendicular to said axis of flow;

said rigidity of said material being sufficiently rigid for minimizing distortion of said cross-section during use of said bearing;

said cross-section comprising a plurality of cross-sections, said rigidity of said material minimizing distortion of each of said plurality of cross-sections during use of said bearing;

said outer portion comprising:

an exterior portion;

an interior portion, said interior portion being disposed to face said inner portion;

at least a portion of said interior portion of said outer portion comprising at least a first portion of said wall means;

at least a portion of said partition comprising at least a second portion of said wall means;

said passage means being disposed within said inner portion;

said outer portion being a first outer portion;

said partition comprising a second outer portion disposed adjacent said first outer portion;

said at least a second portion of said wall means being disposed within said second outer portion of said partition;

said second outer portion of said partition comprising said substantially rigid member, said substantially rigid member being disposed between said inner portion and said first outer portion;

said at least a second portion of said wall means being disposed in said rigid member;

said wall means being in direct contact with the damping fluid;

said second outer portion of said partition comprising means for receiving said rigid member;

said rigid member being disposed in said receiving means of said second outer portion of said partition;

said at least one recess being a first recess;

said rigid member comprising:
 a first edge and a second edge;
 said first edge and said second edge being disposed spaced apart from, and substantially parallel to said wall means;
 said first edge and said second edge being disposed substantially parallel to one another;
 said first edge comprising said first recess;
 said second edge comprising a second recess;

said receiving means of said second outer portion comprising at least a first projection and a second projection;

said first projection being disposed in said first recess of said first edge to interlock with said first recess of said first edge and to form a form-fit between said second outer portion and said rigid member;

said second projection being disposed in said second recess of said second edge to interlock with said second recess of said second edge and to form a form-fit between said second outer portion and said rigid member;

said rigid member further comprising:
 a first side and a second side;
 said first side and said second side being disposed opposite one another;
 said first side being disposed between said first edge and said second edge;
 said second side being disposed between said first edge and said second edge, said second side being disposed immediately adjacent, and substantially parallel to said interior portion of said first outer portion;

said passage means further comprising:
 a groove disposed in said second side of said rigid member, said groove having a first side portion, a second side portion, and a bottom portion;
 said bottom portion being disposed between said first side portion and said second side portion;
 said at least a second portion of said wall means forming said first side portion, said second side portion and said bottom portion of said groove; and said rigid member further comprising:
 sealing means disposed on said first side of said rigid member, said sealing means for providing a seal between said rigid member and said said partition.

2. The bearing according to claim 1 wherein:

said sealing means comprises:
 at least one raised portion;
 said first side and said at least one raised portion are substantially perpendicular to one another; and
 said at least one raised portion extends across the entire extent of said first side of said rigid member.

3. The bearing according to claim 2 wherein:

said passage means further comprises:
 channel means disposed adjacent said rigid member for connecting said groove to said at least two chambers;

said groove comprises at least one of the following characteristics a) and b):
 a) a substantially straight portion; and
 b) at least one bent portion;

said material comprises a plastic material;

said receiving means of said partition comprises a recess;

said groove is disposed about midway between said first edge and said second edge;

said partition comprises:
 a first support member;
 a second support member;
 said first support member and said second support member are disposed at a distance from one another within said partition; and
 said first support member is disposed in said second outer portion.

4. The bearing according to claim 2 wherein:

said groove is a first groove;

said passage means further comprises one of the following c) and d):
 c) a second groove disposed to lead flow of the damping fluid between said at least two chambers; and
 d) a second groove disposed to lead flow of the damping fluid between said at least two chambers, and a third groove disposed to lead flow of the damping fluid between said at least two chambers.

5. The bearing according to claim 2 wherein:

said first recess of said first edge comprises one of the following e) and f):
 e) a triangular shape; and
 f) a semi-circular shape;

said second recess of said second edge comprises one of the following g) and h);
 g) a triangular shape; and
 h) a semi-circular shape.

6. A hydraulically damping elastic bearing comprising:

an inner portion;

an outer portion disposed about said inner portion;

said inner portion comprising:
 a partition disposed at least partially within said outer portion;
 said partition comprising at least an elastic portion;
 said partition and said outer portion defining at least two chambers;
 said at least two chambers being disposed between said inner portion and said outer portion;

said at least two chambers containing damping fluid;

passage means disposed to conduct flow of damping fluid between said at least two chambers;

said passage means being fixedly disposed in said bearing;

said passage means comprising:
wall means;
said wall means being disposed to lead the flow of the damping fluid between said at least two chambers;
said wall means comprising a rigid material;
said rigid material comprising a material having a rigidity sufficient for minimizing distortion of said material during use of said bearing;
means for fixedly disposing said passage means in said bearing;
said means for fixedly disposing comprising a substantially rigid member, said substantially rigid member being disposed between said inner portion and said outer portion;
said substantially rigid member comprising at least one recess for engaging with said partition;
said wall means being disposed in said rigid member;
said wall means defining a centrals axis of flow and comprising a cross-section disposed substantially perpendicular to said axis of flow;
said rigidity of said material being sufficiently rigid for minimizing distortion of said cross-section during use of said bearing;
said cross-section comprising a plurality of cross-sections, said rigidity of said material minimizing distortion of each of said plurality of cross-sections during use of said bearing;

at least a portion of said partition comprising at least a first portion of said wall means;

said passage means being disposed within said inner portion;

said outer portion being a first outer portion;

said partition comprising a second outer portion disposed adjacent said first outer portion;

said at least a first portion of said wall means being disposed within said second outer portion of said partition;

said second outer portion of said partition comprising said substantially rigid member, said substantially rigid member being disposed between said inner portion and said first outer portion;

said at least a first portion of said wall means being disposed in said rigid member;

said second outer portion of said partition comprising means for receiving said rigid member;

said rigid member being disposed in said receiving means of said second outer portion of said partition;

said at least one recess being a first recess;

said rigid member comprising:
a first edge and a second edge;
said first edge and said second edge being disposed spaced apart from, and substantially parallel to, said wall means;
said first edge and said second edge being disposed substantially parallel to one another;
said first edge comprising said first recess;
said second edge comprising a second recess;

said receiving means of said second outer portion comprising at least a first projection and a second projection;

said first projection being disposed in said first recess of said first edge to interlock with said first recess of said first edge and to form a form-fit between said second outer portion and said rigid member;

said second projection being disposed in said second recess of said second edge to interlock with said second recess of said second edge and to form a form-fit between said second outer portion and said rigid member;

said rigid member further comprising:
a first side and a second side;
said first side and said second side being disposed opposite one another;
said first side being disposed between said first edge and said second edge;
said second side being disposed between said first edge and said second edge, said second side being disposed immediately adjacent, and substantially parallel to said interior portion of said first outer portion;
said passage means further comprising:
a groove disposed in said second side of said rigid member, said groove having a first side portion, a second side portion, and a bottom portion;
said at least a first portion of said wall means forming said first side portion, said second side portion, and said bottom portion of said groove;
said bottom portion of said groove being disposed between said first side portion and said second side portion of said groove;

said rigid member further comprising:
sealing means disposed on said first side of said rigid member;
said sealing means for providing a seal between said rigid member and said partition;
said sealing means comprising:
at least one raised portion;
said first side and said at least one raised portion being substantially perpendicular to one another; and
said at least one raised portion extending across the entire extent of said first side of said rigid member.

7. The bearing according to claim 6 wherein:

said passage means further comprises:
channel means disposed adjacent said rigid member for connecting said groove to said at least two chambers;

said groove comprises at least one of the following characteristics a) and b):
 a) a substantially straight portion; and
 b) at least one bent portion;

said material comprises a plastic material;

said receiving means of said partition comprises a recess;

said groove is disposed about midway between said first edge and said second edge;

said partition comprises:
a first support member;
a second support member;
said first support member and said second support member are disposed at a distance from one another within said partition; and
said first support member is disposed in said second outer portion.

8. The bearing according to claim 6 wherein:

said groove is a first groove;

said passage means further comprises one of the following c) and d):

c) a second groove disposed to lead flow of the damping fluid between said at least two chambers; and
d) a second groove disposed to lead flow of the damping fluid between said at least two chambers, and a third groove disposed to lead flow of the damping fluid between said at least two chambers.

9. The bearing according to claim 6 wherein:

said first recess of said first edge comprises one of the following e) and f):

e) a triangular shape; and
f) a semi-circular shape;

said second recess of said second edge comprises one of the following g) and h);

g) a triangular shape; and
h) a semi-circular shape.

* * * * *